United States Patent
Jensen

(10) Patent No.: US 6,848,686 B2
(45) Date of Patent: Feb. 1, 2005

(54) PRINTING ASSEMBLY FOR PRINTING ON SHEETS OF MEDIA FROM A STACK

(75) Inventor: David William Jensen, Balmain (AU)

(73) Assignee: Silverbrook Research Pty LTD, Balmain (AU)

( * ) Notice: Subject to any disclaimer, the term of this patent is extended or adjusted under 35 U.S.C. 154(b) by 40 days.

(21) Appl. No.: 10/703,474

(22) Filed: Nov. 10, 2003

(65) Prior Publication Data

US 2004/0100011 A1 May 27, 2004

Related U.S. Application Data

(63) Continuation of application No. 10/309,230, filed on Dec. 4, 2002, now Pat. No. 6,659,447, which is a continuation of application No. 10/052,425, filed on Jan. 23, 2002, now Pat. No. 6,619,654.

(30) Foreign Application Priority Data

Feb. 7, 2001 (AU) .............................................. PR2925

(51) Int. Cl.[7] ................................................ B65H 3/14
(52) U.S. Cl. ........................... 271/198; 271/97; 271/93; 271/90; 271/94
(58) Field of Search .............................. 271/98, 97, 93, 271/90, 94, 108

(56) References Cited

U.S. PATENT DOCUMENTS

| | | |
|---|---|---|
| 3,558,126 A | 1/1971 | Jiruse |
| 4,496,143 A | 1/1985 | Weyer |
| 4,579,330 A | 4/1986 | Lehmann |
| 4,887,805 A | 12/1989 | Herbert et al. |
| 5,058,876 A | 10/1991 | Grossmann |
| 5,098,077 A | 3/1992 | Russel |
| 5,110,110 A | 5/1992 | Wirz et al. |
| 5,836,582 A | 11/1998 | Ogawa et al. |
| 6,398,206 B1 | 6/2002 | Yang et al. |
| 6,398,207 B1 | 6/2002 | Taylor et al. |
| 6,398,208 B1 | 6/2002 | Yang et al. |

FOREIGN PATENT DOCUMENTS

| | | |
|---|---|---|
| DE | 4 227 814 | 2/1993 |
| EP | 741 098 | 11/1996 |
| SU | 1 680 606 | 9/1991 |

OTHER PUBLICATIONS

Derwent Abstract Accession No. 92–215190/26, SU 1680606 A (MOSC PRINTING INST) Sep. 30, 1991, Abstract.

Primary Examiner—Donald P. Walsh
Assistant Examiner—Matthew J. Kohner

(57) ABSTRACT

A printing assembly for printing on porous sheets of media from a stack of such sheets includes a retaining structure that is configured to retain the stack in an aligned condition. A pick-up device on the retaining structure includes a gas conduit that is in fluid communication with a gas supply and a nozzle arrangement that is in fluid communication with the gas conduit. The nozzle arrangement is shaped to define a pick-up surface. The pick-up device is displaceable along a feed path relative to the retaining structure. The nozzle arrangement is capable of directing a flow of gas onto a first sheet of the stack such that the gas passes partially through the first sheet and impinges on a second sheet, generating a cushion of air between the first and second sheets to separate the first and second sheets. The gas supply is reversible so that the first sheet can be drawn towards the pick-up surface and retained against the pick-up surface. A displacement mechanism displaces the pick-up device along the feed path so that the first sheet is fed from the stack along the feed path. A feed mechanism is positioned downstream of the pick-up device to feed the first sheet along the feed path. A printing station is positioned downstream of the feed mechanism to receive the first sheet and to carry out a printing operation on the first sheet.

7 Claims, 7 Drawing Sheets

PRINTING ASSEMBLY FOR PRINTING ON SHEETS OF MEDIA FROM A STACK

This application is a continuation of U.S. Ser. No. 10/309,230 filed on Dec. 4, 2002, now U.S. Pat. No. 6,659,447, which is a continuation of Ser. No. 10/052,425, filed Jan. 23, 2002, now U.S. Pat. No. 6,619,659.

FIELD OF THE INVENTION

This invention relates to a printing assembly for printing on sheets of media from a stack of the media. In particular, this invention relates to a printing assembly for printing on porous sheets of a media from a stack of such sheets.

BACKGROUND TO THE INVENTION

The applicant has developed various printheads which provide high speed, photographic quality printing. The printheads comprise inkjet nozzles arranged in an array. The inkjet nozzles are formed using microelectromechanical systems (MEMS) technology. The use of MEMS technology results in very high speed printing capabilities where pages can be printed at a rate of up to two pages per second (for double-sided printing).

To facilitate such high speed printing, it is important, firstly, that the paper fed to the printing station of the printer is accurately aligned and capable of the required feed rate with as little likelihood as possible of paper jams or the like occurring. Secondly, the paper must be able to be fed to the printing station at a rate sufficient to use the high speed printing capabilities of the printing station to its fullest extent.

SUMMARY OF THE INVENTION

According to a first aspect of the invention there is provided a printing assembly for printing on porous sheets of media from a stack of such sheets, the printing assembly comprising
  a retaining structure that is configured to retain the stack in an aligned condition;
  a pick-up device that is operatively arranged with respect to the retaining structure, the pick-up device including a gas conduit that is in fluid communication with a gas supply and a nozzle arrangement that is in fluid communication with the gas conduit, the nozzle arrangement being shaped to define a pick-up surface, the pick-up device being displaceable along a feed path relative to the retaining structure, the pick-up device being positioned so that the nozzle arrangement is capable of directing a flow of gas onto a first sheet of the stack such that the gas passes partially through the first sheet and impinges on a second sheet, generating a cushion of air between the first and second sheets to separate the first and second sheets, the gas supply being reversible so that the first sheet can be drawn towards the pick-up surface and retained against the pick-up surface;
  a displacement mechanism that is operatively arranged with respect to the retaining structure for displacing the pick-up device along the feed path so that the first sheet is fed from the stack along the feed path;
  a feed mechanism that is positioned downstream of the displacement mechanism to receive the first sheet from the pick-up device and to feed the first sheet along the feed path; and
  a printing station that is positioned downstream of the feed mechanism to receive the first sheet and carry out a printing operation on the first sheet.

The nozzle arrangement may be shaped so that, as the gas flow is applied to the first sheet at a suitable rate, a region of relatively low pressure is generated between the pick-up surface and the first sheet thereby to facilitate displacement of the first sheet towards the pick-up surface.

The pick-up device may include a pick-up bar that spans the stack of media, the nozzle arrangement being mounted on the pick-up bar and the gas conduit being in the form of an air hose that is attached to the pick-up bar and is connected to the nozzle arrangement.

The displacement mechanism may include
  an axle that is rotatably mounted with respect to the retaining structure;
  a motor that is connected to the axle for rotatably driving the axle; and
  at least one arm that is connected to an end of the axle, the pick-up bar being pivotally mounted on the, or each, arm, so that, on rotation of the axle, the pick-bar is displaced along the feed path.

The feed mechanism may be a roller assembly that is positioned to receive the first sheet. The roller assembly may include a set of primary rollers that are positioned to receive the first sheet and a set of secondary rollers that are positioned downstream of the first set of rollers, a sheet deflector being interposed between the sets of rollers to deflect the first sheet so that the first sheet is fed between the rollers of the secondary set.

The printing station may include a pair of opposed pagewidth printheads that are positioned so that the first sheet is fed between the printheads to permit a printing operation to be carried out on both sides of the first sheet.

According to a second aspect of the invention, there is provided a method of separating a sheet of print media from a stack of sheets, the sheets being porous and the method including the steps of:
  blowing fluid onto a top surface of a topmost sheet of the print media on the stack so that the fluid passes through at least the topmost sheet of the stack; and
  capturing at least a part of the topmost sheet for conveyance to a printing station of a printer.

The method may include blowing the fluid on to the top surface of the topmost sheet through an aperture means of a pick-up means of a print media feed arrangement. The pick-up means may be in the form of a pick-up bar. The aperture means of the pick-up bar may be in any of a number of different forms. For example, the aperture means may be in the form of a channel extending longitudinally along the bar. Instead, the bar may support a plurality of longitudinally spaced, discrete orifices, the orifices defining the aperture means.

The method may include, initially, prior to capturing said at least part of the topmost sheet, lifting said at least part of the topmost sheet from the stack. The method may include causing said lifting of said at least a part of the topmost sheet by creating a low pressure region between a face of the pick-up means and the top surface of the topmost sheet of print media.

According to a further embodiment of the present invention there is provided a method of separating a sheet of print media from a stack of sheets, the sheets being porous and the method includes the steps of:
  applying high pressure to a fluid to cause said fluid to pass through a topmost sheet of the print media on the stack thereby separating the topmost sheet from the stack; and applying low pressure to the fluid to lift from the stack a part of the topmost sheet.

Preferably, the method includes maintaining the pick-up means in spaced relationship relative to the top surface of the topmost sheet of print media to cause said low-pressure region.

The method may include capturing said at least part of the topmost sheet of print media by the pick-up means, preferably by reversing a direction of fluid flow through the pick-up means to cause a change from a blowing action to a suction action.

The method may include conveying said topmost sheet of print media in a direction substantially normal to a direction of flow of fluid blown on to the stack.

BRIEF DESCRIPTION OF THE DRAWINGS

The invention is now described by way of example with reference to the accompanying drawings in which.

DETAILED DESCRIPTION OF THE DRAWINGS

Figure 1:
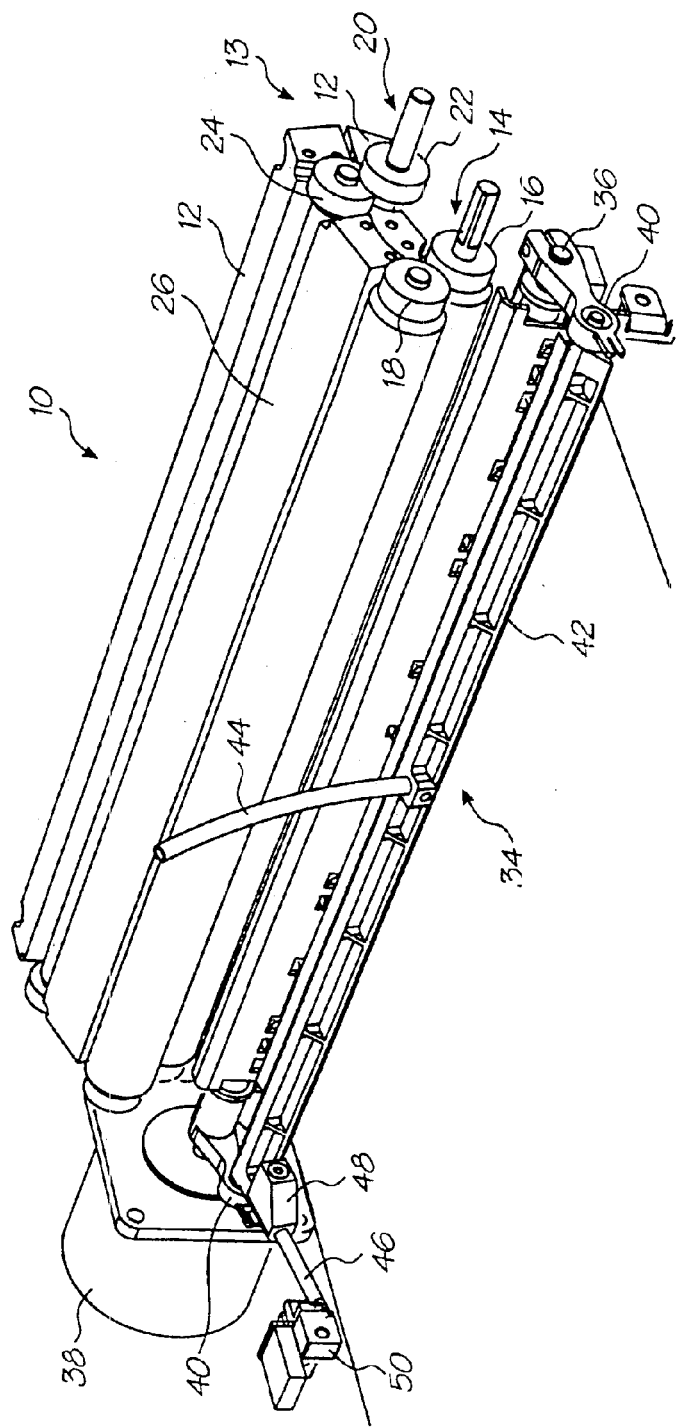
FIG. 1 shows a part of a printer including a print media feed arrangement operated in accordance with the method of the invention.

Referring initially to FIG. 1 of the drawings, a part of a printer is illustrated and is designated generally by the reference numeral 10. The printer 10 is a high speed printer which prints both sides of print media at the rate of approximately one sheet per second or two pages per second (i.e. both sides of the sheet). The print media is, in this case, in the form of a stack of sheets. For ease of explanation, the invention will be described with reference to the print media being a stack of A4 sheets of paper and, more particularly, sheets of paper having a predetermined degree of porosity.

The printer 10 uses a pair of opposed page width printheads 12, arranged at a printing station 13, to print on both sides of sheets of paper fed through the printing station 13. Each printhead 12 is in the form of a microelectromechanical systems (MEMS) chip having an array of ink jet nozzles to achieve the high speed, photographic quality printing desired.

The printing station 13 includes a set of primary rollers 14, comprising a drive roller 16 and a driven roller 18, arranged upstream of the printheads 12 to convey a sheet of paper to the printheads 12. A secondary set of rollers 20, comprising a first roller 22 and a second roller 24, is arranged intermediate the printheads 12 and the set of primary rollers 14. A paper deflector 26 is arranged between the sets of rollers 14 and 20.

Figure 2:
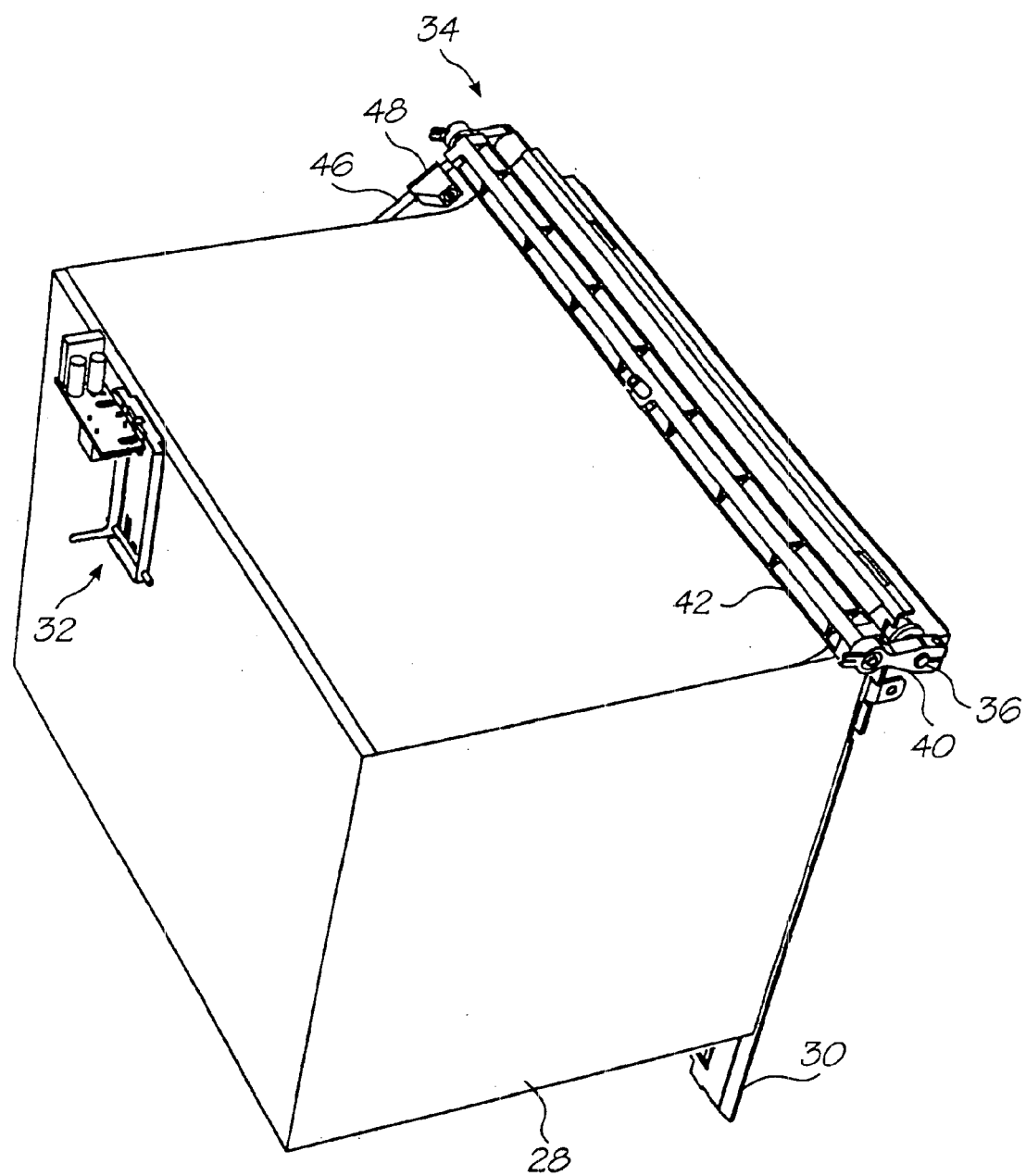
FIG. 2 shows a three-dimensional view of an input region of the printer including part of the print media feed arrangement.

As illustrated more clearly in FIG. 2 of the drawings, the print media is, as described above, arranged in a stack 28. The stack 28 is received in a bin (not shown) of the printer 10 and is retained against a metal bulkhead 30 of the printer 10 in a suitable cabinet (also not shown). A tapping mechanism 32, which is solenoid driven, taps the paper stack 28 to ensure that the sheets of the paper stack 28 are maintained in accurate abutment with the metal bulkhead 30 so that, when a sheet is fed is to the printing station 13, as will be described in greater detail below, the sheet lifted from the stack 28 is aligned to be in register with the printheads 12. In other words, the tapping mechanism 32 inhibits skewing of a sheet picked from the stack 28.

The printer 10 includes a paper feed arrangement 34 for feeding a sheet of paper from the stack 28 to the rollers 16 and 18 of the set of primary rollers 14 so that the sheet of paper can be transported to the printing station 13 for printing.

The feed arrangement 34 comprises a pivot rod or axle 36 which is rotatably driven by a drive means in the form of a stepper motor 38. A swing arm 40 is arranged at each end of the axle 36.

The paper feed arrangement 34 includes a pick-up bar 42 which is connected to a fluid hose 44. The pick-up bar 42 is pivotally attached to the swing arms 40. An arm 46, having a bifurcated end (not shown) projects from one end of the bar 42. The arm 46 is slidably received in a sleeve in the form of a pivot block 48. The arm 46 and, more particularly, its bifurcated end, cooperates with an optical sensor 50 to determine when the pick-up bar 42 is in its home position, the home position of the pick-up bar 42 being shown, schematically, in FIG. 4 of the drawings.

Figure 4:
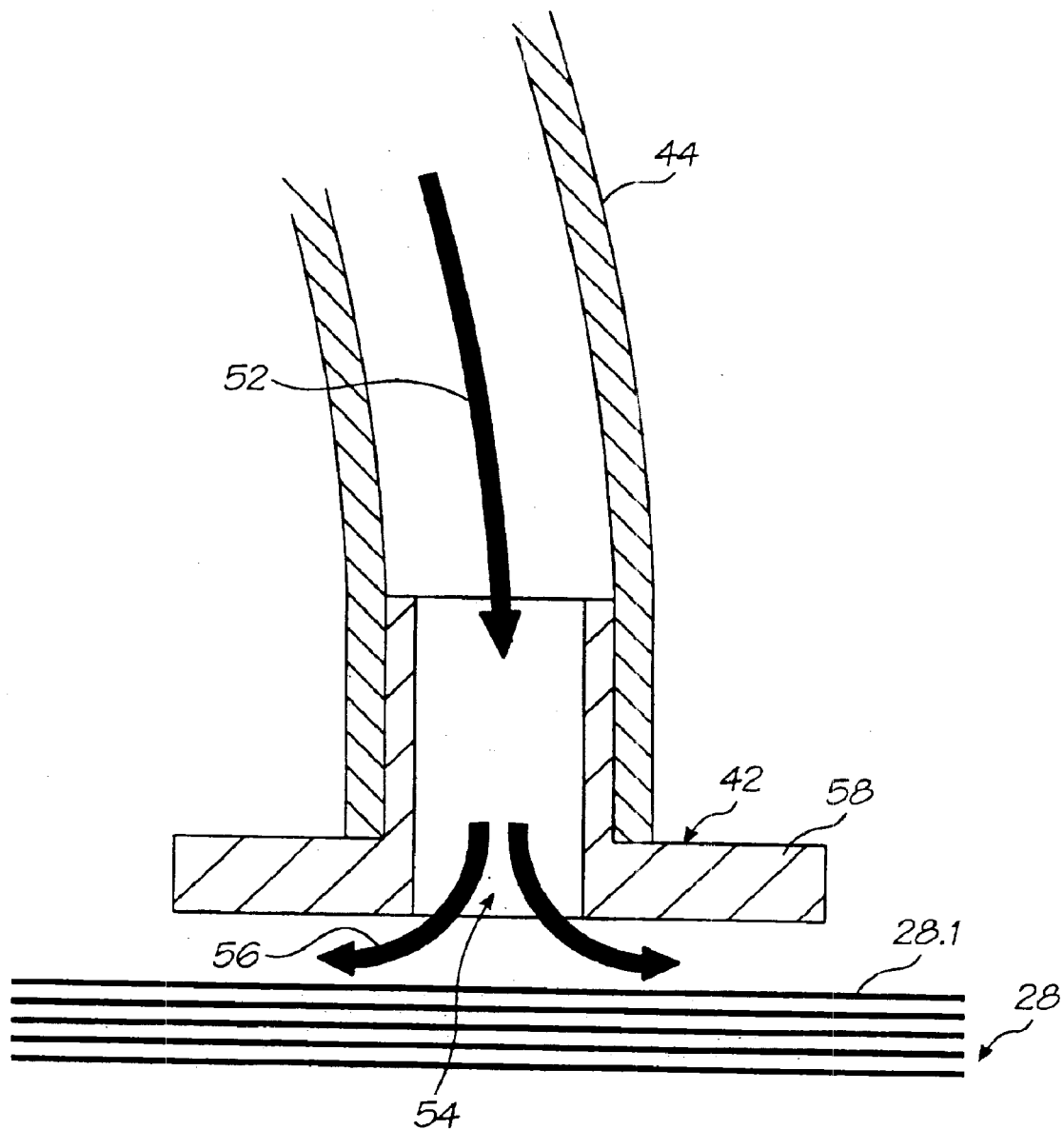
FIG. 4 shows a schematic, sectional side view of an initial stage of operation of the print media feed arrangement.

As described above, the printer 10 is a high-speed printer which has a capacity to print at the rate of one sheet per second. To make use of this capability, it is important that the sheets of paper are fed individually to the printing station 13 from the stack 28 in an accurate, controlled manner. Consequently, it is necessary for the pick-up bar assembly 34 to separate a sheet to be transported to the printing station 13 from the stack 28 accurately. To separate a topmost sheet 28.1 from the stack 28, the fluid hose 44 is connected to a fluid source (not shown). Air is blown down the hose 44 in the direction of arrow 52 as shown in FIG. 4 of the drawings. The air exits through an outlet aperture 54 of the pick-up bar 42 as shown by the arrows 56. The air is forced between a foot portion 58 of the pick-up bar 42 and the topmost sheet 28.1 of the paper stack 28.

The invention is intended particularly for use with print media which is porous such as, for example, 80 gsm paper.

Figure 5:
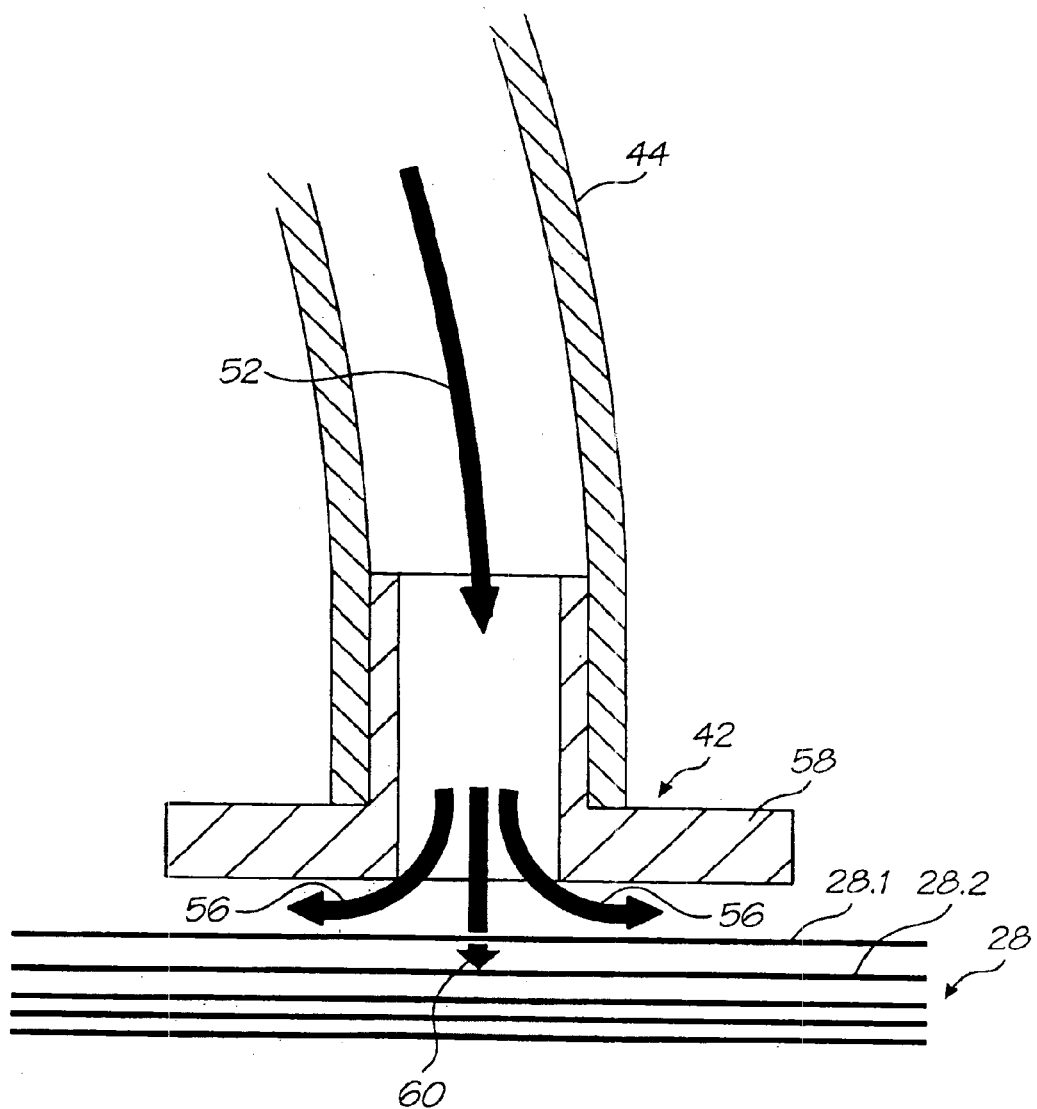
FIG. 5 shows a schematic, sectional side view of a second stage of operation of the print media feed arrangement.

Due to the porosity of the paper, air is also driven through the topmost sheet 28.1 and impinges on a sheet of the stack 28 which is second from the top, as shown by arrow 60 in FIG. 5 of the drawings. This results in an initial separation of the topmost sheet 28.1 from the remainder of the sheets of the stack 28.

Figure 6:
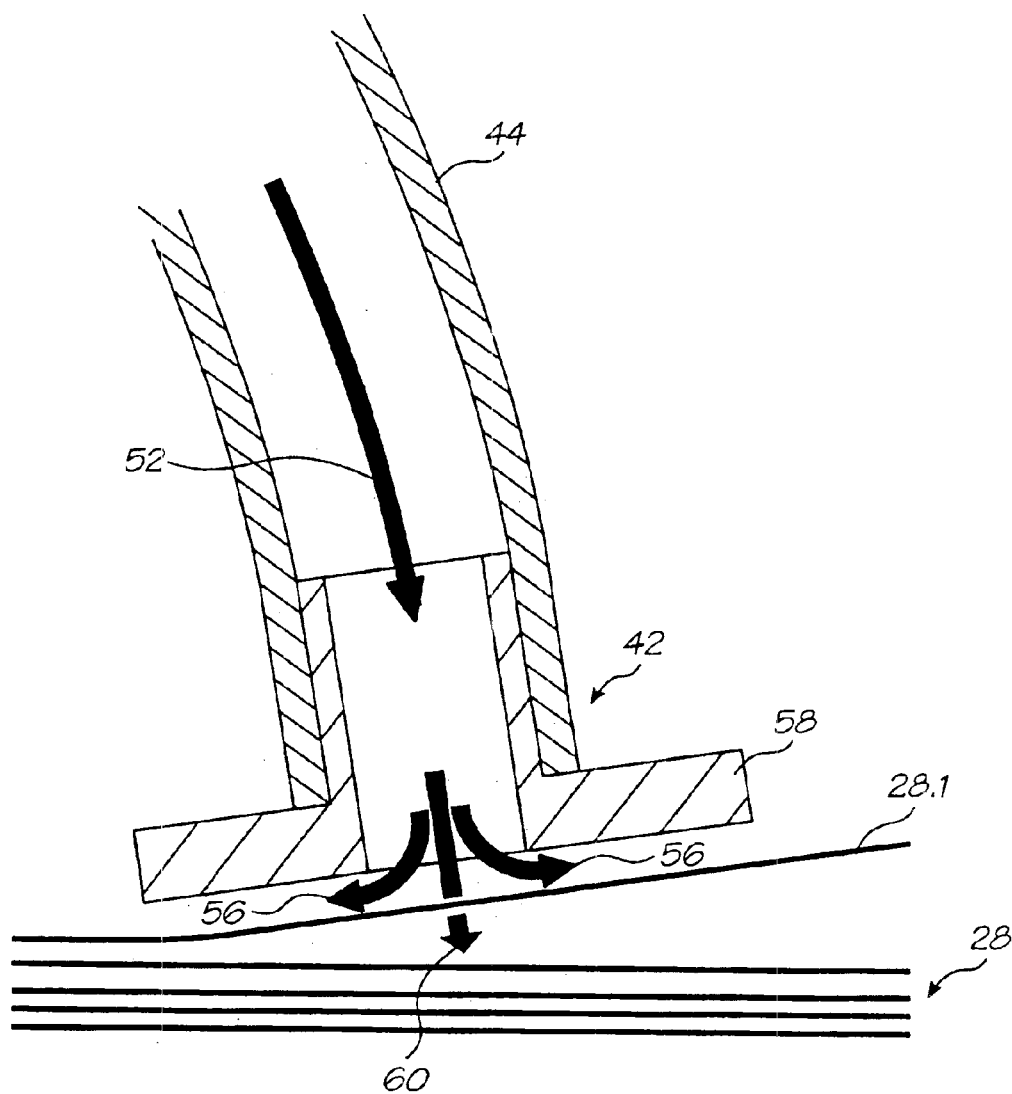
FIG. 6 shows a schematic, sectional side view of a third stage of operation of the print media feed arrangement.

Also, as a result of localised low pressure occurring between a periphery of the foot portion 58 of the pick-up bar 42 and the topmost sheet 28.1 of the stack 28, the topmost sheet 28.1 is attracted to the pick-up bar 42 as shown in FIG. 6 of the drawings. Due to the passage of air through the topmost sheet 28.1 separation of the topmost sheet 28.1 from the remainder of the sheets of the paper stack 28 is aided.

Figure 7:
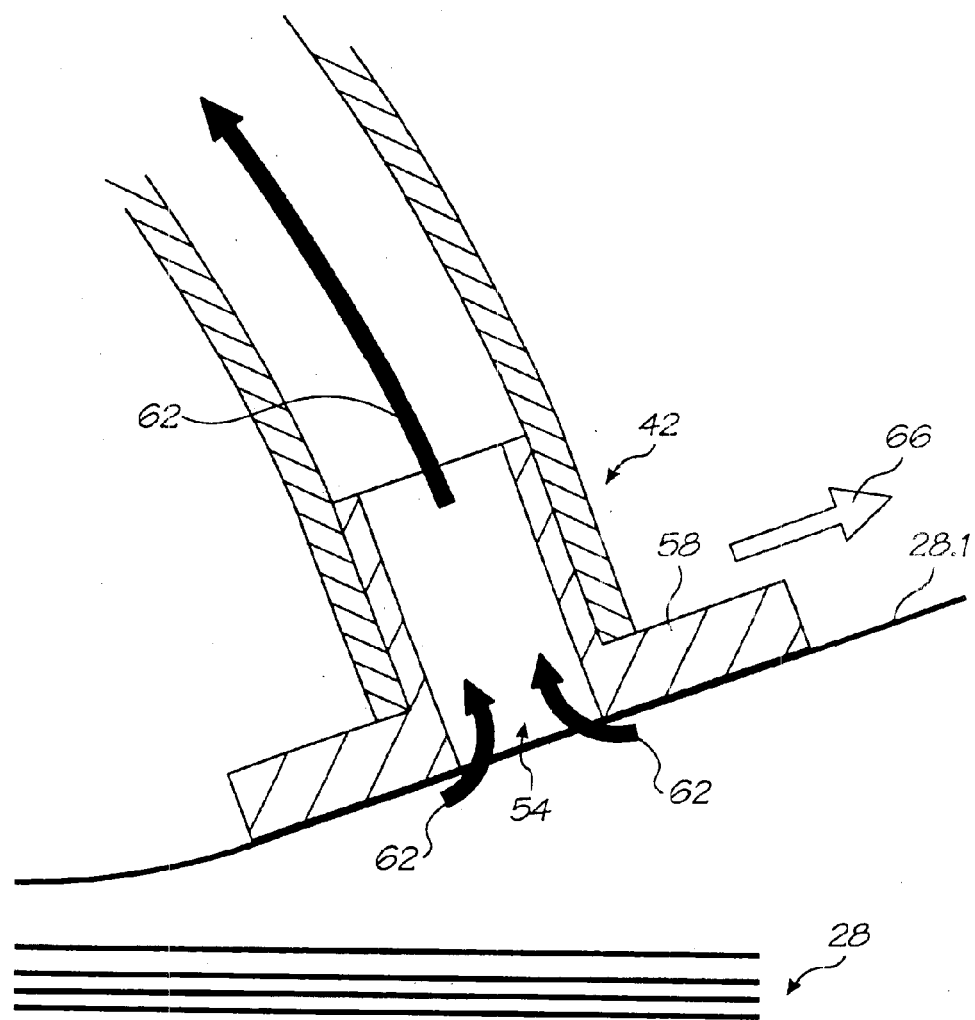
FIG. 7 shows a schematic, sectional side view of a fourth stage of operation of the print media feed arrangement.

Once the sheet 28.1 has been lifted off the stack 28 and transported a short distance from the stack 28 and when the pick-up bar 42 reaches a predetermined altitude relative to the stack 28, the direction of flow of the air is reversed so that a suction effect is imparted at the aperture 54 of the pick-up bar 42. This is shown in FIG. 7 of the drawings by arrows 62.

Figure 3:
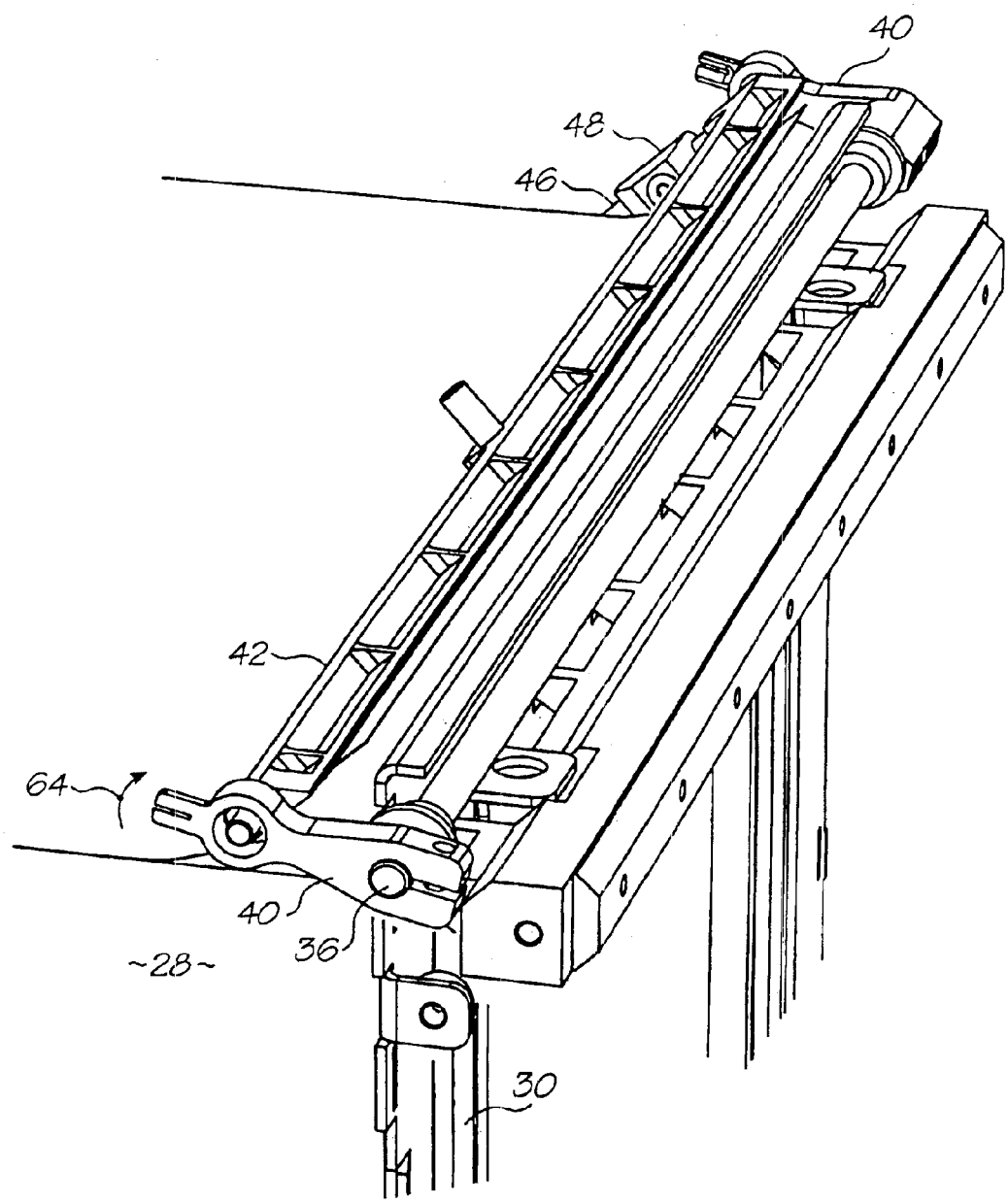
FIG. 3 shows a three dimensional view, on an enlarged scale, of the part of the print media feed arrangement of FIG. 2.

As the swing arms 40 of the paper feed arrangement 34 continue to rotate in the direction of arrow 64 (FIG. 3 of the drawings), the pick-up arm 42 moves in the direction of arrow 66 (FIG. 7) so that a leading edge of the topmost sheet 28.1 of the paper stack 28 is fed between the rollers 16 and 18 of the set of primary drive rollers 14. The suction is then shut off in the hose 44 so that the sheet 28.1 is released from the pick-up bar 42 for onward conveyance by the sets of rollers 14 and 20 to the printing station 13 for printing purposes.

It will be appreciated that the airflow parallel to a surface of the topmost sheet 28.1 of the stack 28 results in a low friction cushion which facilitates translational motion of the sheet 28.1 relative to the pick-up bar 42. This allows the sheet 28.1 to be moved by any suitable method in a direction normal to a face of the pick-up bar 42 without hindering the picking action of the pick-up bar 42. It also facilitates maintaining a trailing portion of the sheet 28.1 in spaced relationship relative to the stack 28 while the sheet 28.1 is being fed to the set of rollers 14.

The applicant has found that the velocity of air through the fluid hose in the initial, "blowing" direction is not critical, nor is the spacing between the pick-up bar 42 and the topmost sheet 28.1 of the paper stack 28. Further, the weight or grade of the paper of the stack is also not critical provided that the paper in the stack has a degree of porosity.

Typically, a pressure of approximately 5 kPa is present in the fluid hose 14 when the air is blown on to the paper stack 28. The air is delivered at approximately 1 l/s and exits the gap between the foot portion 58 of the pick-up arm 42 and the topmost sheet 28.1 at a pressure of approximately 1 kPa at a velocity of approximately 50 m/s. Experimentally, the pick-up arm 42 has been held at a spacing of between 0.1 mm and 0.2 mm above the paper stack 28 to pick-up the topmost sheet 28.1 and this has been found to be successful. In addition, the paper feed arrangement 34 has been found to operate with paper of a grade from 40 gsm to high resolution, photo-quality ink jet paper.

The aperture 54 of the pick-up bar 42 can also be any suitable shape. For example, the aperture 54 could be in the form of a straight or wavy channel extending the length of the pick-up bar 42. Instead, the aperture could comprise a plurality of discrete nozzles arranged at spaced intervals along the length of the pick-up bar 42.

The applicant has found that, surprisingly, by blowing air on to the paper of the stack 28 separation of the sheets is facilitated. This is an entirely counter-intuitive approach, as one would expect that a suction-type mechanism would operate better. However, provided the paper of the stack 28 is porous, very good separation of the topmost sheet of paper from the stack 28 can be effected.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A printing assembly for printing on porous sheets of media from a stack of such sheets, the printing assembly comprising a retaining structure that is configured to retain the stack in an aligned condition;

a pick-up device that is operatively arranged with respect to the retaining structure, the pick-up device including a gas conduit that is in fluid communication with a gas supply and a nozzle arrangement that is in fluid communication with the gas conduit, the nozzle arrangement being shaped to define a pick-up surface, the pick-up device being displaceable along a feed path relative to the retaining structure, the pick-up device being positioned so that the nozzle arrangement is capable of directing a flow of gas onto a first sheet of the stack such that the gas passes partially through the first sheet and impinges on a second sheet, generating a cushion of air between the first and second sheets to separate the first and second sheets, the gas supply being reversible so that the first sheet can be drawn towards the pick-up surface and retained against the pick-up surface;

a displacement mechanism that is operatively arranged with respect to the retaining structure for displacing the pick-up device along the feed path so that the first sheet is fed from the stack along the feed path;

a feed mechanism that is positioned downstream of the displacement mechanism to receive the first sheet from the pick-up device and to feed the first sheet along the feed path; and a printing station that is positioned downstream of the feed mechanism to receive the first sheet and carry out a printing operation on the first sheet.

2. A printing assembly as claimed in claim 1, in which the nozzle arrangement is shaped so that, as the gas flow is applied to the first sheet at a suitable rate, a region of relatively low pressure is generated between the pick-up surface and the first sheet thereby to facilitate displacement of the first sheet towards the pick-up surface.

3. A printing assembly as claimed in claim 1, in which the pick-up device includes a pick-up bar that spans the stack of media, the nozzle arrangement being mounted on the pick-up bar and the gas conduit being in the form of an air hose that is attached to the pick-up bar and is connected to the nozzle arrangement.

4. A printing assembly as claimed in claim 3, in which the displacement mechanism includes an axle that is rotatably mounted with respect to the retaining structure;

a motor that is connected to the axle for rotatably driving the axle; and at least one arm that is connected to an end of the axle, the pick-up bar being pivotally mounted on the, or each, arm, so that, on rotation of the axle, the pick-bar is displaced along the feed path.

5. A printing assembly as claimed in claim 1, in which the feed mechanism is in the form of a roller assembly that is positioned to receive the first sheet.

6. A printing assembly as claimed in claim 5, in which the roller assembly includes a set of primary rollers that are positioned to receive the first sheet and a set of secondary rollers that are positioned downstream of the first set of rollers, a sheet deflector being interposed between the sets of rollers to deflect the first sheet so that the first sheet is fed between the rollers of the secondary set.

7. A printing assembly as claimed in claim 1, in which the printing station includes a pair of opposed pagewidth printheads that are positioned so that the first sheet is fed between the printheads to permit a printing operation to be carried out on both sides of the first sheet.

* * * * *